US012524923B2

(12) United States Patent
Zhang et al.

(10) Patent No.: US 12,524,923 B2
(45) Date of Patent: Jan. 13, 2026

(54) METHOD OF ENCODING AND DECODING, ENCODER, DECODER

(71) Applicants: BEIJING XIAOMI MOBILE SOFTWARE CO., LTD., Beijing (CN); XIDIAN UNIVERSITY, Shaanxi (CN)

(72) Inventors: Wei Zhang, Shaanxi (CN); Mary-Luc Georges Henry Champel, Beijing (CN)

(73) Assignees: BEIJING XIAOMI MOBILE SOFTWARE CO., LTD., Beijing (CN); XIDIAN UNIVERSITY, Shaanxi (CN)

( * ) Notice: Subject to any disclaimer, the term of this patent is extended or adjusted under 35 U.S.C. 154(b) by 287 days.

(21) Appl. No.: 18/030,240

(22) PCT Filed: Oct. 6, 2020

(86) PCT No.: PCT/CN2020/119829
§ 371 (c)(1),
(2) Date: Apr. 4, 2023

(87) PCT Pub. No.: WO2022/073156
PCT Pub. Date: Apr. 14, 2022

(65) Prior Publication Data
US 2023/0410377 A1 Dec. 21, 2023

(51) Int. Cl.
*G06T 9/40* (2006.01)
(52) U.S. Cl.
CPC ..................................... *G06T 9/40* (2013.01)
(58) Field of Classification Search
CPC .......... G06T 9/40; H04N 19/91; H04N 19/96; H04N 19/186; H04N 19/597
See application file for complete search history.

(56) References Cited

U.S. PATENT DOCUMENTS 10,693,492 B1  6/2020 Lasserre et al.
2020/0396489 A1* 12/2020 Flynn ........................ G06T 9/00

FOREIGN PATENT DOCUMENTS

CN   111615791 A   9/2020
CN   111699697 A   9/2020

OTHER PUBLICATIONS

Indian Patent Application No. 202347031853, Office Action dated Jul. 2, 2024, 6 pages.

(Continued)

*Primary Examiner* — Sing-Wai Wu
(74) *Attorney, Agent, or Firm* — Cozen O'Connor

(57) ABSTRACT

A method for encoding and decoding, an encoder and decoder for a point cloud is disclosed. The method for encoding a point cloud to generate a bitstream of compressed point cloud data, the point cloud's geometry being represented by an octree-based structure with a plurality of nodes having parent-child relationships by recursively splitting a volumetric space containing the point cloud into sub-volumes each associated with a node of the octree-based structure, including: determining context information of a current node including plane position context information, the plane position context information of the current node being determined according to an occupancy of a neighboring node directly adjacent to the current node and an occupancy of at least one sibling node having the same parent node as the current node; and entropy encoding the occupancy information of the current node based on the determined context information to produce encoded data for the bitstream.

16 Claims, 5 Drawing Sheets

(56) References Cited

OTHER PUBLICATIONS

PCT/CN2020/119829, Search Report dated Jun. 29, 2021, 2 pages.
European Patent Application No. 20956471.5, Search and Opinion dated Jul. 12, 2023, 13 pages.
Zhang, W. et al. [G-PCC] [new proposal] Planar mode improvement, ISO/IEC JTC1/SC29/WG11 MPEG202/m53522, Apr. 2020, 5 pages.

* cited by examiner

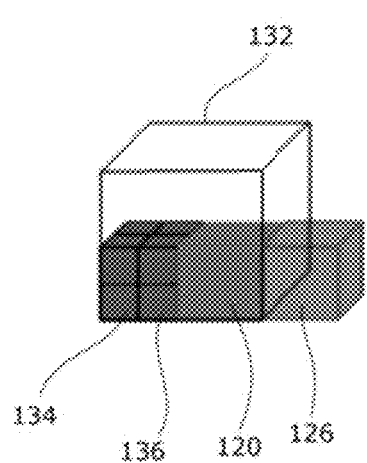
Fig. 7(a)
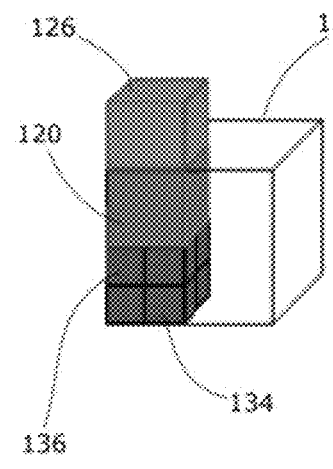
Fig. 7(b)
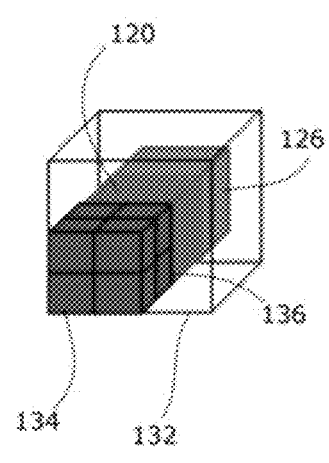
Fig. 7(c)
Fig. 8(a)
Fig. 8(b)

METHOD OF ENCODING AND DECODING, ENCODER, DECODER

CROSS-REFERENCE TO RELATED APPLICATION

This application is a U.S. national phase of International Application No. PCT/CN2020/119829, filed on Oct. 6, 2020, the entire contents of which are incorporated herein by reference.

FIELD

The present application generally relates to point cloud compression. Preferably, the present application relates to a method of encoding and decoding as well as an encoder and decoder for improved entropy coding of point clouds.

BACKGROUND

As an alternative to 3D meshes, 3D point clouds have recently emerged as a popular representation of 3D media information. Use cases associated with point cloud data are very diverse and include:
- 3D assets in movie production,
- 3D assets for real-time 3D immersive telepresence or VR applications,
- 3D free viewpoint video (for instance for sports viewing),
- Geographical Information Systems (cartography),
- Cultural heritage (storage of fragile assets in digital form),
- Autonomous driving (large scale 3D mapping of environment) . . .

A point cloud is a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

For each point of a point cloud, its position (usually an X, Y, Z information coded as a floating point with 32 or 64 bits) and its attributes (usually at least an RGB color coded in 24 bits) need to be stored. With sometimes billions of points in a point cloud, one can easily understand that the raw data of a point cloud can be several Gigabytes of data: hence, there is a strong need for compression technologies so as to reduce the amount of data required to represent a point cloud.

Two different approaches have been developed for point cloud compression:

First, in the Video based Point Cloud Compression (VPCC) approach, a point cloud is compressed by performing multiple projections of it on the 3 different X, Y, Z axes and at different depths so that all points are present in one projected image. Then the projected images are processed into patches (to eliminate redundancy) and re-arranged into a final picture where additional metadata is used to translate pixel positions into point positions in space. The compression is then performed using traditional image/video MPEG encoders. The advantage of this approach is that it reuses existing coders and it naturally supports dynamic point clouds (using video coders) but this is hardly usable for sparse point clouds. It is expected that the compression gain would be higher with methods specifically designed for point clouds.

Second, in the Geometry based Point Cloud Compression (GPCC) approach, point positions (usually referred to as the geometry) and point attributes (color, transparency . . . ) are coded separately. In order to code the geometry, an octree structure is used. The whole point cloud is fitted into a cube which is continuously split into eight sub-cubes until each of the sub-cubes contains only a single point. The position of the points is therefore replaced by a tree of occupancy information at every node. Since each cube has only 8 sub-cubes, 3 bits are enough to code the occupancy and therefore for a tree of depth D, 3° bits are needed to code the position of a point. While this transformation alone is not enough to provide significant compression gain, it should be noted that since it is a tree, many points share the same node values and thanks to the use of entropy coders, the amount of information can be significantly reduced.

Understanding that many point clouds include surfaces, in the current design of GPCC, a planar coding mode was introduced to code such eligible nodes of the octree more efficiently.

Thus, a flag isPlanar is introduced, which indicates whether or not the occupied child nodes belong to a same horizontal plane. If isPlanar is true, then an extra bit planePosition is signaled to indicate whether the plane is in the lower plane or the upper plane.

The isPlanar flag is coded by using a binary arithmetic coder with the 3 bit context information as planar context information indicating an axis normal to the plane. Further, if the node is planar, the planePosition information is coded by using a binary arithmetic coder with 72 (=2×3×2×2) bit context information as plane position context information including the following information:
- a) The occupancy of two vertical neighbors adjacent to the current node. (4 contexts: 00, 01, 10, 11)
- b) the distance d from the closest already coded node at same coordinate and depth, d is discretized into three values: "near" or "not too far" or "far",
- c) the plane position (if any) of the closest already coded node at same coordinate and depth, and
- d) axisIdx (value=0, 1, or 2) identifying the axis normal to a plane.

Additionally, an angular coding mode was introduced to enhance planar coding mode using angular context for sparse point cloud data, where neighbor occupancy tends to be zero (i.e., empty) in most cases. More specifically, angular coding mode replaces the context information when coding planePosition with a reduced context information and the isPlanar flag is still arithmetically coded using the same context model as in planar coding mode.

However, in the current methods for encoding and decoding of point clouds, information of the neighboring nodes is not considered.

Thus, it is an object of the present invention to provide an encoding and decoding method as well as an encoder and decoder enabling improved quick and accurate data compression of point clouds.

SUMMARY

In an aspect of the present invention, a method for encoding a point cloud to generate a bitstream of compressed point cloud data is provided, in which the point cloud's geometry is represented by an octree-based structure with a plurality of nodes having parent-child relationships by recursively splitting a volumetric space containing the point cloud into sub-volumes each associated with a node of the octree-based structure, including the steps:
  determining a context information of a current node including plane position context information for at least one geometrical axis, in which the plane position context information of the current node on the at least one geometrical axis is determined according to an occupancy of a neighboring node directly adjacent to the current node on at least one geometrical axis and an occupancy of at least one sibling node having same parent node as the current node; and entropy encoding the occupancy information of the current node based on the determined context information to produce encoded data for the bitstream.

In an aspect of the present invention, a method for decoding a bitstream of compressed point cloud data to generate a reconstructed point cloud is provided, in which the point cloud's geometry is represented by an octree-based structure with a plurality of nodes having parent-child relationships by recursively splitting a volumetric space containing the point cloud into sub-volumes each associated with a node of the octree-based structure, including the steps:

entropy decoding the bitstream based on context information of a current node, in which the context information including plane position context information for at least one geometrical axis and the plane position context information of the current node on the at least one geometrical axis is determined according to an occupancy of a neighboring node directly adjacent to the current node on the at least one geometrical axis and an occupancy of at least one sibling node having the same parent node as the current node.

In an aspect of the present invention, an encoder is provided for encoding a point cloud to generate a bitstream of compressed point cloud data, in which the point cloud's geometry is represented by an octree-based structure with a plurality of nodes having parent-child relationships by recursively splitting a volumetric space containing the point cloud into sub-volumes each associated with a node of the octree-based structure, the encoder including:

a processor and a memory storage device, in which in the memory storage device instructions executable by the processor are stored that, when executed, cause the processor to perform the method according to the above-described methods for encoding and decoding.

In an aspect of the present invention, a decoder is provided for decoding a bitstream of compressed point cloud data to generate a reconstructed point cloud, in which the point cloud's geometry is represented by an octree-based structure with a plurality of nodes having parent-child relationships by recursively splitting a volumetric space containing the point cloud into sub-volumes each associated with a node of the octree-bases structure, the decoder including:

a processor and a memory storage device, in which in the memory storage device instructions executable by the processor are stored that, when executed, cause the processor to perform the above-described method of decoding.

In an aspect of the present invention a non-transitory computer-readable storage medium is provided storing processor-executed instructions that, when executed by a processor, cause the processor to perform the above-described method of encoding and/or decoding.

BRIEF DESCRIPTION OF THE DRAWINGS

Reference will now be made, by way of example, to the accompanying drawings which show example embodiments of the present application, and in which the Figures show:

FIGS. 7(a)-7(c) are illustrations of a further embodiment of point cloud processing.

FIGS. 8(a) and 8(b) are flow charts illustrating methods for encoding a point cloud, in embodiments.

DETAILED DESCRIPTION OF THE DRAWINGS

Figure 1:
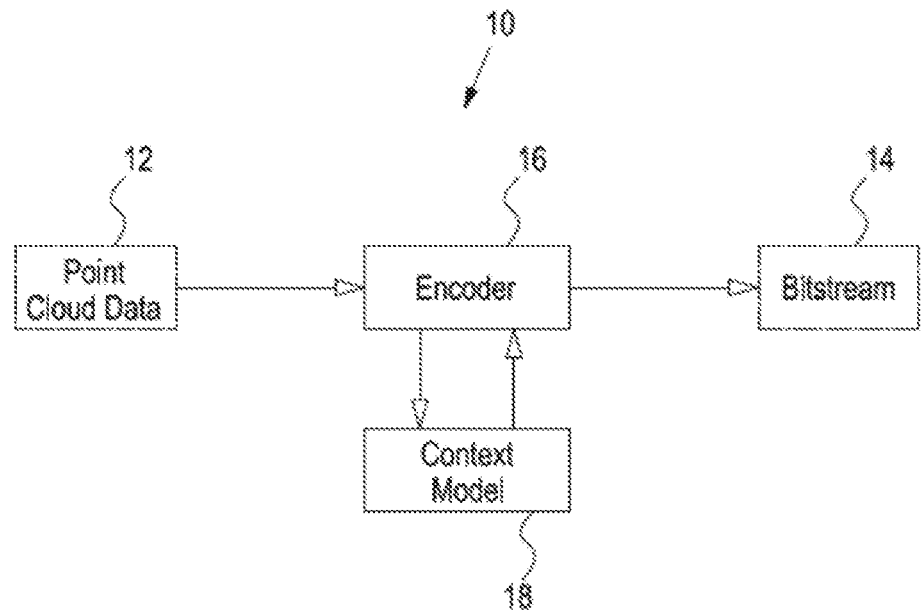
FIG. 1 is a block diagram showing a general view of the point cloud encoder.

The present application describes methods of encoding and decoding point clouds, and encoders and decoders for encoding and decoding point clouds. A present parent node associated with a sub-volume is split into further sub-volumes, each further sub-volume corresponding to a child node of the present parent node, and, at the encoder, a context information of a current node is determined including plane position context information for at least one geometrical axis, in which the plane position context information of the current node on the at least one geometrical axis is determined according to the occupancy of a neighboring node directly adjacent to the current node on the at least one geometrical axis and the occupancy of at least one sibling node having the same parent node as the current node. The entropy encoder encodes the occupancy pattern based on the determined planar context information to produce encoded data for the bitstream. The decoder determines the same context information and entropy decodes the bitstream to reconstruct the occupancy pattern.

In an aspect of the present invention, a method for encoding a point cloud to generate a bitstream of compressed point cloud data is provided, in which the point cloud's geometry is represented by an octree-based structure with a plurality of nodes having parent-child relationships by recursively splitting a volumetric space containing the point cloud into sub-volumes each associated with a node of the octree-based structure, including the steps:

determining a context information of a current node including plane position context information for at least one geometrical axis, in which the plane position context information of the current node on the at least one geometrical axis is determined according to an occupancy of a neighboring node directly adjacent to the current node on at least one geometrical axis and an occupancy of at least one sibling node having the same parent node as the current node; and entropy encoding the occupancy information of the current node based on the determined context information to produce encoded data for the bitstream.

Therein, the context information including the plane position context information of the current node indicating the likelihood of a plane position in the current node, i.e. a prediction of the plane position in the current node, in which the plane position context information is determined on the basis of the occupancy of a neighboring node and the occupancy of at least one sibling node. This neighboring node is at the same depth D of the tree-structure as the current node and directly adjacent to the current node, i.e. sharing a common surface with the current node. Therein, the neighboring node has a different parent node (at depth D−1) than the current node. Further, the plane position context information is determined according to the occupancy of at least one or more sibling nodes. The at least one or more sibling node sharing a common parent node with the current node and is on the same depth D in the tree-structure. Therein, the occupancy indicates whether the respective node includes at least one point of the point cloud. The plane position context information includes information about a possible plane position or position of a surface represented by the point cloud going through the current node. Therein, information about the occupancy of at least one sibling node and one neighboring node of the current node is considered to determine context information for the entropy encoding. As a consequence, more reliable predictions about occupancy of the current child node can be made which can be used for increased data reduction by the entropy encoder. In this manner, the complete tree is traversed to determine an occupancy for each node and provides sufficient context information for the entropy encoder thereby decreasing the necessary amount of data for representation of the point cloud.

Preferably, the neighboring node sharing a common surface with the current node along a geometrical axis under consideration directly before or directly after the current node along this axis. The geometrical axis can be one of the X, Y, Z axis. If, for example, the X axis is under consideration, along the X axis, the neighboring node is arranged either directly before or directly after the current node. Thus, the neighboring node is selected dependent on the axis under consideration for including occupancy information of the neighboring node in the determination of the context information.

Preferably, the at least one or more sibling node encompasses one of
one sibling node directly before the current node along a geometrical axis sharing a face with the current node and preferably the occupancy of sub-nodes of the one sibling node; or
a group of four sibling nodes in a plane directly after the current node along the geometrical axis, in which the plane is perpendicular to the geometrical axis under consideration.

The geometrical axis can be one of the X, Y, Z axis. The at least one or more sibling nodes may include one sibling node. Then, if the X axis is under consideration, along the X axis, the one sibling node is arranged directly before the current node. Alternatively, the at least one or more sibling nodes may include a group of four sibling nodes arranged in a plane perpendicular to the X axis, i.e. in the Y-Z-plane. Therein, the group of four sibling nodes is arranged in the plane directly after the current node along the X axis.

Preferably, the planar context information is determined along all three geometrical axes. Thus, planes or surfaces represented by the points of the point cloud are evaluated along each axis.

Preferably, for a given geometrical axis, if the current node is at a low plane of the parent node, plane position context information is determined according to the occupancy of a group of sub-nodes of the neighboring node, in which each of the sub-nodes sharing a face with the current node, and an occupancy of a group of four sibling nodes in a high plane of the parent node.

Therein, the parent node of the current node along a certain axis defines two planes perpendicular to this specific axis. Each plane consists of four nodes in an octree-structure. Along the certain axis, first the low plane and subsequently the high plane is arranged. For example, going along the X-axis, the four nodes of the parent node in the Y-Z-plane coming first forming the low plane and the four nodes coming last in the same parent node forming the high plane. This order of the low plane and high plane is also the order of encoding. Further, the occupancy of a group of sub-nodes of the neighboring node being on a depth D+1 in the tree-structure is used for determining the plane position context information. Therein, each of the sub-nodes in the group of considered sub-nodes of the neighboring node sharing a common surface with the current node. In addition, since the current node is in the low plane, the neighboring node is arranged directly before the current node along the axis under consideration. Therein, the sub-nodes have not the same parent node as the current node. Contrary, the group of four sibling nodes share a common parent node with the current node and are arranged in the high plane of the common parent node. Thus, the group of four sibling nodes is arranged directly after the current node along the axis under consideration. For determining the plane position context information, information about the occupancy of the sub-nodes and the occupancy of the sibling nodes is included in order to improve the prediction of the context model. Thus, sufficient information can be acquired to provide a reliable prediction about the plane position context information to be encoded.

Preferably, if at least one sub-node of the group of sub-nodes of the neighboring node is occupied and all sibling nodes of the group of sibling nodes are unoccupied the plane position context information includes the likelihood of a plane in the current node and the likelihood of a low plane position.

Preferably, if all sub-nodes of the group of sub-nodes of the neighboring node are unoccupied and at least one of the sibling nodes of the group of sibling nodes is occupied, the plane position context information includes the likelihood of a plane in the current node and the likelihood of a high plane position.

Preferably, if all sub-nodes of the group of sub-nodes of the neighboring node are unoccupied and all sibling nodes of the group of sibling nodes are unoccupied, the plane position context information is unknown.

Preferably, if at least one sub-nodes of the group of sub-nodes of the neighboring node is occupied and at least one sibling node of the group of sibling nodes is occupied, the plane position context information is unknown.

Preferably, for the case that the occupancy of the already-coded nodes is not available, i.e. the adjacent_child_contextualization_enabled_flag is set to zero, then the following applies if the current node is in the low plane:
if the neighboring node is unoccupied and all sibling nodes of the group of sibling nodes are unoccupied, the plane position context information includes the likelihood of a plane in the current node and the likelihood of a low plane position;
if the neighboring node is unoccupied and at least one of the sibling nodes of the group of sibling nodes is occupied, the plane position context information includes the likelihood of a plane in the current node and the likelihood of a high plane position;

if the neighboring node is unoccupied and all sibling nodes of the group of sibling nodes are unoccupied, the plane position context information is unknown; and if neighboring node is occupied and at least one sibling node of the group of sibling nodes is occupied, the plane position context information is unknown.

Thus, even in the case that due to data restriction, occupancy of the already-coded nodes is no longer available, by the occupancy of the sibling nodes and the neighboring node itself, sufficient inference can be made with respect to the plane position context information. Therein, instead of the group of sub-nodes of the neighboring node the occupancy of the neighboring node itself is considered.

Preferably, for a given geometrical axis, if the current node is at a high plane of the parent node, plane position context information is determined according to the occupancy of a group of sub-nodes of one sibling node in a low plane of the parent node, in which each of the sub-nodes sharing a face with the current node, and the occupancy of a neighboring node opposite to the one sibling node relative to the current node. Therein, the parent node of the current node along a certain axis defines two planes perpendicular to the axis. Each plane consists of four nodes. Along the certain axis, first the low plane and subsequently the high plane is arranged. For example, going along the X-axis, the four nodes of the parent node in the Y-Z-plane coming first forming the low plane and the four nodes coming last in the present parent node forming the high plane. This order of the low plane and high plane is also the order of encoding. Further, the occupancy of a group of sub-nodes of the one sibling node being at a depth D+1 in the tree-structure is used for determining the plane position context information. Therein, each of the sub-nodes in the group of considered sub-nodes of the sibling node sharing a common surface with the current node. In addition, if the current node is in the high plane, the sibling node is arranged directly before the current node alone the axis under consideration, i.e. in the low plane. Therein, the sub-nodes have the same parent node as the current node. Contrary, the neighboring node has a different parent node (at depth D−1) as the current node and is arranged directly after the current node along the axis under consideration and opposite to the one sibling node relative to the current node. For determining the plane position context information, information about the occupancy of the sub-nodes of the one sibling node and the occupancy of the neighboring node is included in order to improve the prediction of the context model. Thus, sufficient information can be acquired to provide a reliable prediction about the plane position context information to be encoded.

Preferably, if at least one sub-node of the group of sub-nodes of the sibling node is occupied and the neighboring node is unoccupied, the plane position context information includes the likelihood of a plane in the current node and the likelihood of a low plane position.

Preferably, if all sub-nodes of the group of sub-nodes of the sibling node are unoccupied and the neighboring node is occupied, the plane position context information includes the likelihood of a plane in the current node and the likelihood of a high plane position.

Preferably, if all sub-nodes of the group of sub-nodes of the sibling node are unoccupied and the neighboring node is unoccupied, the plane position context information is unknown.

Preferably, if at least one sub-nodes of the group of sub-nodes of the sibling node is occupied and the neighboring node is occupied, the plane position context information is unknown.

Preferably, for the case that the occupancy of the already-coded nodes is not available, i.e. the adjacent_child_contextualization_enabled_flag is set to zero, then the following applies if the current node is in the high plane:

if the one sibling node is occupied and the neighboring node is unoccupied the plane position context information includes the likelihood of a plane in the current node and the likelihood of a low plane position;

if the one sibling node is unoccupied and the neighboring node is occupied, the plane position context information includes the likelihood of a plane in the current node and the likelihood of a high plane position;

if the one sibling node is unoccupied and the neighboring node is unoccupied, the plane position context information is unknown; and if the one sibling node is occupied and the neighboring node is occupied, the plane position context information is unknown.

Thus, even in the case that due to data restriction, occupancy of the already-coded nodes is no longer available, by the occupancy of the sibling node itself and the neighboring node sufficient inference can be made with respect to the plane position context information. Therein, instead of the group of sub-nodes of the sibling node the occupancy of the one sibling node itself is considered.

Preferably, if the coding mode is the planar coding mode, for the at least one an preferably for each of the geometrical axis, the plane position context information includes one or more of:

The inferred plane position for the current node determined as described above;

The distance d from the closest already coded node at the same coordinate in the respective parent node and the same depth D in the octree-based structure;

The plane position of the closest already coded node at the same coordinate in the respective parent node and the same depth D in the octree-based structure; and The indication of an axis normal to the plane.

Therein, in particular, the inferred plane position is discretized into the values "predicted low", "predicted high", and "unknown". Further, the distance d is discretized into the values "near", "not too far" and "far". If the already coded node at the same coordinate and depth D exists at all, then also the plane position, i.e. "high" or "low", may be included to the context information. The axis normal to the plane may has the values 0, 1, or 2. Therein, the coordinate of the respective node is the relative position within its parent node. In particular, the plane position context information includes more than one or all of the above-mentioned information. In particular, in the planar coding mode, the plane position context information may consist of the above-mentioned information.

Preferably, the plane position context information is coded by using a binary arithmetic coder with 54 (=3×3× 2×3) context bits. Thus, by adapting the plane position context information the coding efficiency can be enhanced and at the same time the necessary amount of information is reduced compared to the current plane position context model.

Preferably, if the closest already coded node at the same coordinate in the respective parent node and the same depth D in the octree-based structure is non-existent, then the plane position context information only includes the plane position of the current node according to the occupancy of at least one sibling node and a neighboring node as described above. Thus, the plane position context information is determined in this case alone from the information gathered from the neighboring node and the at least one sibling node. No further information is accessible and therefore used. But due to including the information from the neighboring node and at least one sibling node, efficient compression is feasible even in this case.

Preferably, if the coding mode is the angular coding mode and the current node is not eligible for angular coding mode, the coding context information includes plane position context information, in which the plane position context information includes only:

The plane position of the current node according to the occupancy of at least one sibling node and a neighboring node as described above.

Thus, in this case, the plane position context information of the planar coding mode is used.

In an aspect of the present invention, a method for decoding a bitstream of compressed point cloud data to generate a reconstructed point cloud is provided, in which the point cloud's geometry is represented by an octree-based structure with a plurality of nodes having parent-child relationships by recursively splitting a volumetric space containing the point cloud into sub-volumes each associated with a node of the octree-bases structure, including the steps:

entropy decoding the bitstream based on context information of a current node, in which the context information including plane position context information for at least one geometrical axis and the plane position context information of the current node on the at least one geometrical axis is determined according to an occupancy of a neighboring node directly adjacent to the current node on the at least one geometrical axis and an occupancy of at least one sibling node having the same parent node as the current node. Therein, the context information including plane position context information of the current node indicating the likelihood of a plane position in the current node, i.e. a prediction of the plane position, in which the plane position context information is determined on the basis of the occupancy of a neighboring node and the occupancy of at least on sibling node. This neighboring node is at the same depth D of the tree-structure as the current node and directly adjacent to the current node, i.e. sharing a common surface with the current node. Therein, the neighboring node has a different parent node (at depth D−1) than the current node. Further, the plane position context information is determined according to the occupancy of at least one or more sibling nodes. The at least one or more sibling node sharing a common parent node with the current node and is on the same depth D in the tree-structure. Therein, the occupancy indicates whether the respective node includes at least one point of the point cloud. The plane position context information includes information about a possible plane position or position of a surface represented by the point cloud going through the current node. Therein, information about the occupancy of at least one sibling node and one neighboring node of the current node is considered to determine context information for the entropy encoding. As a consequence, more reliable predictions about occupancy of the current child node can be made which can be used for increased data reduction by the entropy encoder. In this manner, the complete tree is traversed to determine an occupancy for each node and provides sufficient context information for the entropy encoder.

Preferably, the method of decoding is further built according to the features described above with respect to the method for encoding. These features can be freely combined with the method of decoding.

Other aspects and features of the present application will be understood by those of ordinary skill in the art from a review of the following description of examples in conjunction with the accompanying figures.

At times in the description below, the terms "node" and "sub-volume" may be used interchangeably. It will be appreciated that a node is associated with a sub-volume. The node is a particular point on the tree that may be an internal node or a leaf node. The sub-volume is the bounded physical space that the node represents. The term "volume" may be used to refer to the largest bounded space defined for containing the point cloud. The volume is recursively divided into sub-volumes for the purpose of building out a tree-structure of interconnected nodes for coding the point cloud data.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three-component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured and highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on the resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

Figure 3:
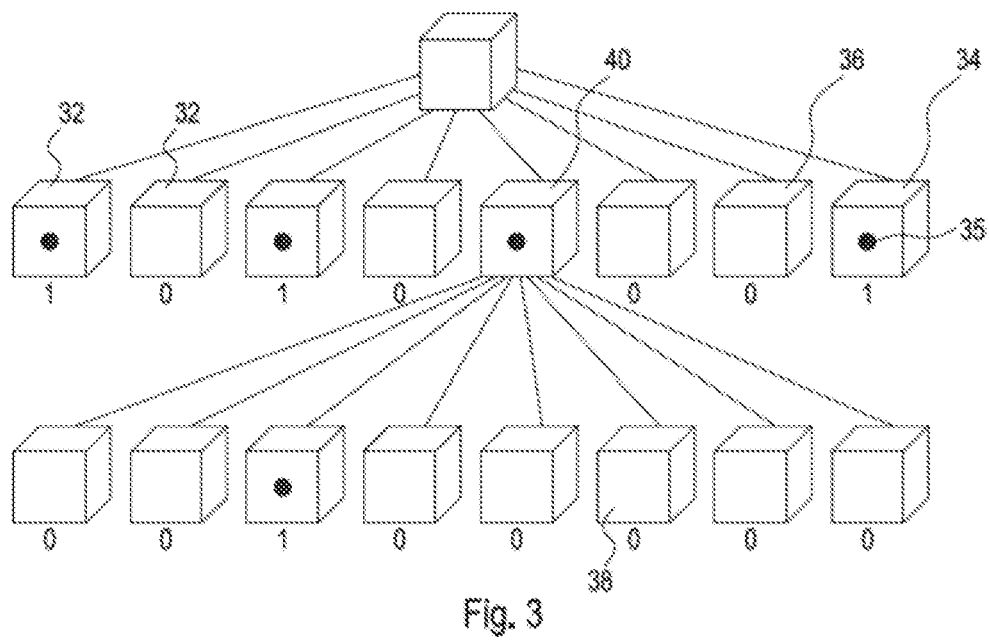
FIG. 3 is a schematic illustration of an octree data structure.

A commonly-used tree structure is an octree. In this structure, the volumes/sub-volumes are all cubes and each split of a sub-volume results in eight further sub-volumes/sub-cubes. An example for such a tree-structure is shown in FIG. 3 having a node 30 that might represent the volume containing the complete point cloud. This volume is split into eight sub-volumes 32, each associated with a node in the octree of FIG. 3. Points in the nodes indicate occupied nodes 34 containing at least one point 35 of the point cloud, while empty nodes 36 are representing sub-volumes with no points of the point clouds. As depicted in FIG. 3, occupied nodes might by further split into eight sub-volumes associated with child nodes 38 of a particular parent node 40 in order to determine the occupancy pattern of the parent node 40. As shown in FIG. 3, the occupancy pattern of the exemplified parent node 40 might be represented as "00100000" in a binary form, indicating an occupied third child node 38. In some realizations this occupancy pattern is encoded by a binary entropy encoder to generate a bitstream of the point cloud data.

Reference is now made to FIG. 1, which shows a simplified block diagram of a point cloud encoder 10 in accordance with aspects of the present application. The point cloud encoder 10 receives the point cloud data and might include a tree building module for producing an octree representing the geometry of the volumetric space containing point cloud and indicating the location or position of points from the point cloud in that geometry.

The basic process for creating an octree to code a point cloud may include:
1. Start with a bounding volume (cube) containing the point cloud in a coordinate system;
2. Split the volume into 8 sub-volumes (eight sub-cubes);
3. For each sub-volume, mark the sub-volume with 0 if the sub-volume is empty, or with 1 if there is at least one point in it;
4. For all sub-volumes marked with 1, repeat (2) to split those sub-volumes, until a maximum depth of splitting is reached or there is at most one point in each sub-volumes.

The tree may be traversed in a pre-defined order (breadth-first or depth-first, and in accordance with a scan pattern/order within each divided sub-volume) to produce a sequence of bits representing the occupancy pattern of each node.

This sequence of bits may then be encoded using an entropy encoder 16 to produce a compressed bitstream 14. The entropy encoder 16 may encode the sequence of bits using a context model 18 that specifies probabilities for coding bits based on a context determination by the entropy encoder 16. The context model 18 may be adaptively updated after coding of each bit or defined set of bits.

Like with video or image coding, point cloud coding can include predictive operations in which efforts are made to predict the pattern for a sub-volume, and the residual from the prediction is coded instead of the pattern itself. Predictions may be spatial (dependent on previously coded sub-volumes in the same point cloud) or temporal (dependent on previously coded point clouds in a time-ordered sequence of point clouds).

Figure 2:
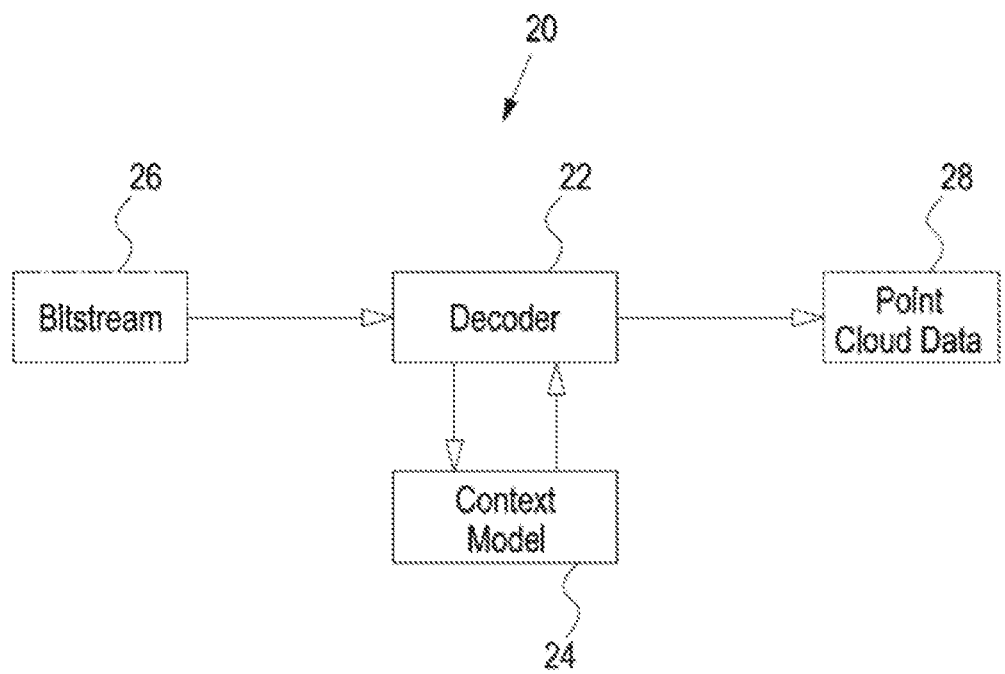
FIG. 2 is a block diagram showing a general view of the point cloud decoder of FIG. 1.

A block diagram of an example point cloud decoder 20 that corresponds to the encoder is shown in FIG. 2. The point cloud decoder 20 includes an entropy decoder 22 using the same context model 24 used by the encoder 10. The entropy decoder 22 receives the input bitstream 26 of compressed data and entropy decodes the data to produce an output sequence of decompressed bits. The sequence is then converted into reconstructed point cloud data by a tree reconstructor. The tree reconstructor rebuilds the tree structure 28 from the decompressed data and knowledge of the scanning order in which the tree data was binarized. The tree reconstructor is thus able to reconstruct the location of the points from the point cloud.

Figure 4:
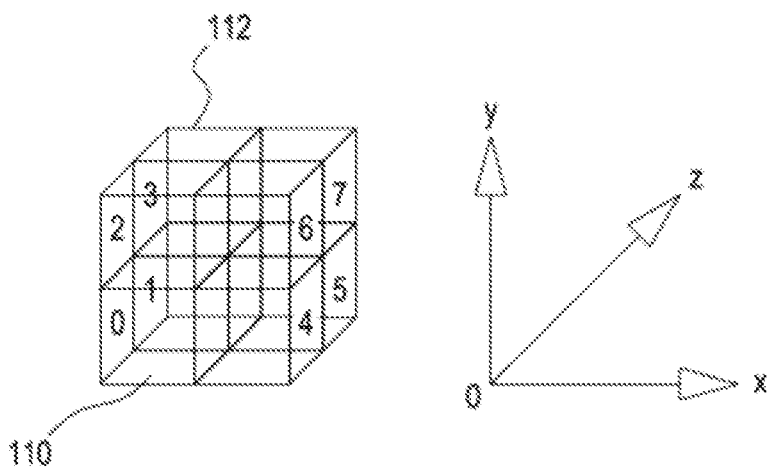
FIG. 4 is a schematic illustration of a numbering scheme of the eight sub-nodes in each node of the octree data structure of FIG. 3.

Referring to FIG. 4, showing a parent node 112 split into its eight child nodes 110 being 2×2×2 cubes with each having the same size and with an edge length being half the edge length of the cube associated with the parent node 112. Further, FIG. 4 indicates the used numbering of the child nodes 110 within a parent node 112. The numbering system shown in FIG. 4 will be used in the following for further explanation. Therein, FIG. 4 also indicates the spatial orientation of the shown parent node 112 in the three-dimensional space indicated by the geometrical axis X, Y, Z.

Therein, the occupancy pattern might include planar information about whether a certain node is occupied and the point in this node belongs to a surface. Usually, the real world is dominated by closed surfaces. This is in particular true for indoor rooms but also for urban outdoor scenes. This fact is used by the entropy encoder and decoder. If a surface represented by the point cloud can be detected, predictions about the distribution of point on this surface can be made and thus a probability for the occupancy of a certain node belonging to this surface can be made. This might be done by defining context information used for encoding and decoding an isPlanar-flag in the bitstream. Therein, isPlanar-flag is usually a binary value in which for a certain node it is coded with planar context information that there is a prevailing likelihood that this node belongs to a certain surface. In addition to the mere fact of the presence of a surface in a node, further planar information might be considered such as plane position context information used for the coding of a planePosition-flag indicating the position of the plane within the present child node. planePosition-flag might also be a binary value, having the values "high" and "low" referring to the respective position in the node. This planar information is used for encoded to the bitstream by usage of the planar context information by the entropy encoder/decoder thereby reducing the data of the bitstream. Further plane position information can be associated with the plane position context information for a more reliable prediction of a surface, and thus occupancy, in the respective node.

Further, additional coding modes exist which are applied to different types of point clouds, using also different context information. Thus, planar coding mode and angular coding mode are defined. Therein, angular coding mode is preferably applied to sparsely populated point clouds, in which it is the intention to provide angular context information to the entropy encoder/decoder. Therein, the coding mode might be indicated in the metadata of the bitstream.

Figure 5:
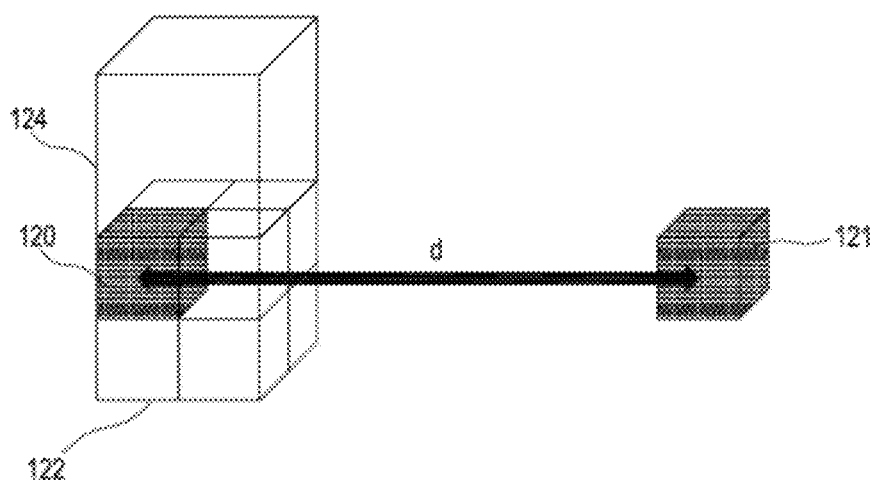
FIG. 5 is an illustration of plane position context information, in embodiments.

Thus, in accordance to the present disclosure, in the case of the planar coding mode, the context information includes planar context information and plane position context information as indicated above in the case that a plane exists in the current node. Therein, the planar context includes the likelihood of a plane through the current node. Further, plane position context information for the current node is determined according to the occupancy of a neighboring node and at least one sibling node having the same parent node as the current node, as described in greater detail below. Additionally, the plane position context information is depicted in FIG. 5. The plane position context information includes the information of:

a) The inferred plane position in the current node as described in more detail below;
b) The distance d from the closest already coded node at the same coordinate in the respective parent node and the same depth D in the octree-based structure;
c) The plane position of the closest already coded node at the same coordinate in the respective parent node and the same depth D in the octree-based structure; and
d) The indication of an axis normal to the plane.

Therein, in particular, the plane position context information is discretized into the values "predicted low", "predicted high", and "unknown". Further, the distance d is discretized into the values "near", "not too far" and "far". If the already coded node at the same coordinate and depth D in the tree structure exists at all, then also the plane position, i.e. "high" or "low", may be included to the context information. The axis normal to the plane may has the values 0, 1, or 2. Therein, the coordinate of the respective node is the relative position within its parent node.

Thus, the planar context information is 1 bit (plane or no plane), and the plane position context information is 3×3×2×3=54 bit information.

Figure 6:
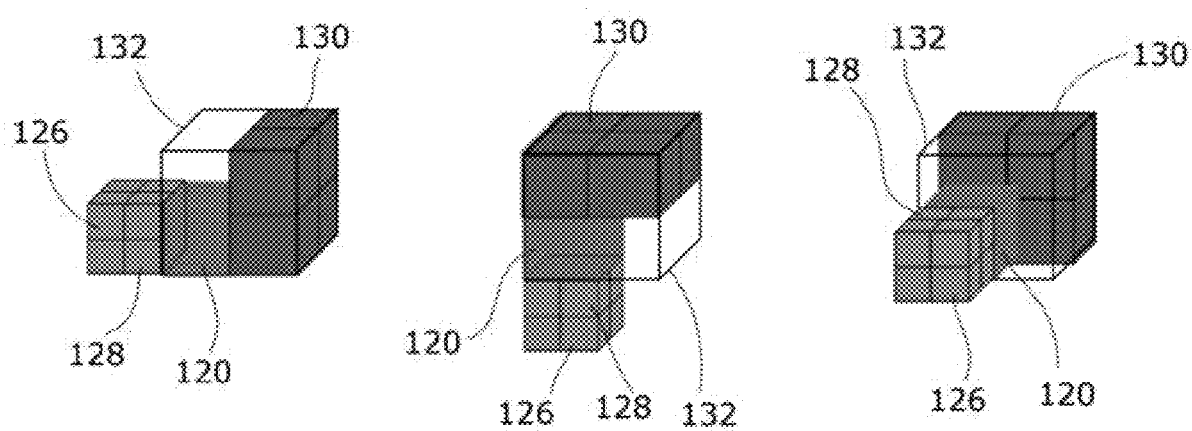
FIGS. 6(a)-6(c) are illustrations of a data structure for determining plane position context information, in embodiments.

For the determining of the prediction of the plane position in the plane position context information, it is referred to FIGS. 6 and 7 showing a present parent node 132 having eight nodes in the octree-structure. Therein, at least one of the child nodes is occupied. Further, indicated in FIGS. 6 and 7 is a neighboring node 126. Therein, context information for a current node 120, being a child node of the parent node 132, shall be evaluated and used for entropy encoding. Therein, if the current node 120 is at a depth D in the octree structure, the parent node 132 is at a depth D−1, while the neighboring node 126 is also at a depth D in the octree-structure. Further, the child nodes of the present parent node 132 are denoted as sibling nodes sharing a common parent node 132 with the current node 120. Therein, the neighboring node has a different parent node than the current node. When predicting the context information of the current node 120 at a certain octree-level D, occupancy information of the three adjacent neighboring nodes 126 in the octree along each of the geometrical axis X, Y, Z are utilized (If the neighboring node is prior the current node in the order of decoding, then even the occupancy of the sub-nodes of the neighboring node 126—at level D+1—is known and can be considered. If the neighboring node 126 is after the current node in the order of decoding, then at least the occupancy of the neighboring node 126—at level D—is known and can be used for prediction). Since these three previous neighboring nodes are adjacent to the current node 120, there exists a correlation between the occupancy of these neighboring nodes and the current node 120 to be coded. This information is easy to obtain but currently not used in existing encoding and decoding methods. For example, if evaluating the context information of the current node 120 along the X-axis, the directly adjacent neighboring node along the X-axis might be considered. Thus, during decoding the occupancy of the prior nodes are known by the decoder and can be used to determine context information. If the context information is evaluated along the Y-axis, the neighboring node along the Y-axis next to the current node 120 might be considered. This information is also known to the decoder and can be easily used to acquire reliable context information for the current node 120.

Further, also the occupancy of the sibling nodes of the second group 130 is known since for the present parent node 132 first the occupancy of its child nodes is determined and afterwards, in a subsequent step, the context information of the child nodes is determined. Thus, at the time of decoding the current node 120, occupancy information of the sibling nodes are known at the decoder side. This information is unused in current methods for encoding and decoding. Thus, the present invention uses also this additional information in order to enhance the efficiency of encoding and decoding.

When considering the correlation between the occupancy of the current node and the occupancy of the neighboring node and the at least one sibling node, also the position of the current node to be coded must be taken into account. Therein, the plane position indicates a plane of the parent node of the current node along the axis under consideration and a plane perpendicular to this geometrical axis. Along the X-axis for example, a low plane is defined by the child nodes 0-3, while a high plane is defined by the child nodes 4-7. Along the Y-axis, the low plane is defined by the child nodes 0, 1, 4, 5 and a high plane by the child nodes 2, 3, 6, 7. Along the Z-axis, a low plane is defined by the child nodes 0, 2, 4, 6 and a high plane by the child nodes 1, 3, 5, 7.

Now referring to FIG. 6 showing the configuration of how to determine plane position context information and in particular a prediction for the plane position from the occupancy of the neighboring node 126 of the current node 120 together with occupancy information of the sibling nodes of the current node 120 within the same parent node 132 which then can be used in the entropy encoding in order to compress the point cloud data. In this regard, it is an object of the present invention to consider the occupancy of the neighboring node 126 directly adjacent to the present child node 120 together with the occupancy of the sibling nodes and to incorporate such information in the context information when coding the current node. Therein, FIG. 6 refers to the situation that the current node 120 to be coded is in the low position of the present parent node 132.

FIG. 6 (a) shows the determination of the planar context information along the X-axis. The context information and in particular the plane position context information of the current node 120 shall be evaluated. Therefore, the occupancy of a group 130 of four sibling node being in the high plane of the present parent node 132 as well as the neighboring node 126 directly adjacent to the current node 120 is evaluated. Therein, the neighboring node 126 is arranged along the X-axis which is to be evaluated. For example, as depicted in FIG. 6 (a), if the current node 120 is at the position 0 in the present parent node 132, then the neighboring node to be considered is at the position 4 in the directly adjacent neighboring parent node and so on. Further, the neighboring node 126 is arranged prior to the current node 120 in order of decoding, i.e. along the X-axis. Thus, upon decoding the current node 120, all information about the neighboring node 126 is already available. In particular, occupancy information about the sub-nodes, being the child nodes of the neighboring node 126 at a depth D+1 in the octree-structure is known. In addition, also during encoding the information of the current node 120 information about the neighboring node 126 is also known, since positions of the individual point of the point cloud and thus the occupancy of the individual nodes are completely known to the encoder.

In particular, in order to determine the context information of the current node 120, a first group 128 of sub-nodes of the neighboring node 126, being child nodes of the neighboring node 126, and a second group 130, being child nodes of the present parent node 120, i.e. sibling nodes of the current node 120, are considered. Therein, the four sub-nodes of the first group 128 of the neighboring node 126 are directly next and adjacent to the current node 120. Thus, the sub-nodes of the first group 128 each share a common surface with the present parent node 120. Since the current node 120 is in the low plane in its parent node 132, the considered sub-nodes of the first group 128 of the neighboring node 126 are at the high plane of the neighboring node 126. The second group 130 of the four sibling nodes of the present parent node 132 are directly opposite the neighboring node 126. Thus, since the current node 120 is at the low plane of its parent node 132, the four sibling nodes of the second group 130 are at the high plane of the common parent node 132. Thus, by these two groups of nodes a reliable determination of the context information can be provided and a prediction about the plane position can be made. A surface in the point cloud going through the current node 120 is also highly likely going through one of the planes defined by the first group 128 or the second group 130 and thus the context information of the current node 120 strongly depends on the occupancy of the first group 128 and/or the occupancy of the second group 130.

Generally speaking for the case that the current node is at a low plane of the parent node, the plane position context information is determined according to the occupancy of a group of sub-nodes of the neighboring node, in which each of the sub-nodes sharing a face with the current node, and an occupancy of a group of four sibling nodes in a high plane of the parent node. If at least one sub-node of the group of sub-nodes of the neighboring node is occupied and all sibling nodes of the group of sibling nodes are unoccupied, the plane position context information includes the likelihood of a plane in the current node and the likelihood of a low plane position. If all sub-nodes of the group of sub-nodes of the neighboring node are unoccupied and at least one of the sibling nodes of the group of sibling nodes is occupied, the plane position context information includes the likelihood of a plane in the current node and the likelihood of a high plane position. If all sub-nodes of the group of sub-nodes of the neighboring node are unoccupied and all sibling nodes of the group of sibling nodes are unoccupied, the plane position context information is "unknown". If at least one sub-nodes of the group of sub-nodes of the neighboring node is occupied and at least one sibling node of the group of sibling nodes is occupied, the plane position context information is "unknown".

More specifically speaking, in accordance with the FIG. 6, for the evaluation along the X-axis together with the numbering system shown in FIG. 4 if the current node is in the low plane:

If at least one of the sub-nodes 4 to 7 of the neighboring node 126 is occupied and all sibling nodes 4 to 7 of the group 130 of sibling nodes are not occupied, the plane position context information includes the likelihood of a plane in the current node 120 and the likelihood of a low plane position.

If the sub-nodes 4 to 7 of the neighboring node 126 are not occupied and at least one of the sibling nodes 4 to 7 of the group 130 of sibling nodes is occupied, the plane position context information includes the likelihood of a plane in the current node 120 and the likelihood of a high plane position.

If the sub-nodes 4 to 7 of the neighboring node 126 are not occupied and the sibling nodes 4 to 7 of the group 130 of sibling nodes are not occupied, the plane position context information is "UNKNOWN".

If at least one of the sub-nodes 4 to 7 of the neighboring node 126 is occupied and at least one of the sibling nodes 4 to 7 of the group 130 of sibling nodes is occupied the plane position context information is "UNKNOWN".

Thus, for the coding the probability of a position of a plane perpendicular to the X-axis in the current node is considered as context information when performing entropy coding for the current node being in the low position. Therein, the information might be used as plane position context information in the planar coding mode and the angular coding mode.

For evaluating along Y-axis in accordance to FIG. 6 (*b*) in order to determine the plane position context information of the current node 120 if the current node is in the low plane, it is set the following:

If at least one of the sub-nodes 2, 3, 6, 7 of the neighboring node 126 is occupied and all sibling nodes 2, 3, 6, 7 of the group 130 of sibling nodes are not occupied, the plane position context information includes the likelihood of a plane in the current node 120 and the likelihood of a low plane position.

If the sub-nodes 2, 3, 6, 7 of the neighboring node 126 are not occupied and at least one of the sibling nodes 2, 3, 6, 7 of the group 130 of sibling nodes is occupied, the plane position context information includes the likelihood of a plane in the current node 120 and the likelihood of a high plane position.

If the sub-nodes 2, 3, 6, 7 of the neighboring node 126 are not occupied and the sibling nodes 2, 3, 6, 7 of the group 130 of sibling nodes are not occupied, the plane position context information is "UNKNOWN".

If at least one of the sub-nodes 2, 3, 6, 7 of the neighboring node 126 is occupied and at least one of the sibling nodes 2, 3, 6, 7 of the group 130 of sibling nodes is occupied the plane position context information is "UNKNOWN".

Thus, for the coding the probability of a position of a plane perpendicular to the Y-axis in the current node is considered as context information when performing entropy coding for the current node being in the low position. Therein, the information might be used as plane position context information in the planar coding mode and the angular coding mode.

For evaluating along the Z-axis in accordance to FIG. 6 (*c*) in order to determine the planar context information of the current node 120 if the current node 120 is in the low plane, it is set the following:

If at least one of the sub-nodes 1, 3, 5, 7 of the neighboring node 126 is occupied and all sibling nodes 1, 3, 5, 7 of the group 130 of sibling nodes are not occupied, the plane position context information includes the likelihood of a plane in the current node 120 and the likelihood of a low plane position.

If the sub-nodes 1, 3, 5, 7 of the neighboring node 126 are not occupied and at least one of the sibling nodes 1, 3, 5, 7 of the group 130 of sibling nodes is occupied, the plane position context information includes the likelihood of a plane in the current node 120 and the likelihood of a high plane position.

If the sub-nodes 1, 3, 5, 7 of the neighboring node 126 are not occupied and the sibling nodes 1, 3, 5, 7 of the group 130 of sibling nodes are not occupied, the plane position context information is "UNKNOWN".

If at least one of the sub-nodes 1, 3, 5, 7 of the neighboring node 126 is occupied and at least one of the sibling nodes 1, 3, 5, 7 of the group 130 of sibling nodes is occupied the plane position context information is "UNKNOWN".

Thus, for the coding the probability of a position of a plane perpendicular to the Z-axis in the current node is considered as context information when performing entropy coding for the current node being in the low position. Therein, the information might be used as plane position context information in the planar coding mode and the angular coding mode.

As indicated above, the situation is different, if the current node 120 is in high plane of its parent 132 as depicted in FIG. 7. Then, the current node 120 is next to the neighboring node 126 following the current node 120 along the axis under consideration. In this case, at the decoder side the occupancy of the sub-nodes of the neighboring node 126 are unknown and only the occupancy of the adjacent neighboring node 126 itself can be used in order to determine the context information. However, occupancy information of one sibling node 134 can be utilized in order to determine the context information of the current node 120. Therein, the sibling node is arranged on the axis under consideration directly before the current node 120. In particular, the context information of the current node 120 is determines on the basis of the occupancy of the neighboring node 126 and further on the basis of a group 136 of sub-nodes of the one sibling node 134, in which each of the sub-nodes of the group 136 are directly adjacent to the current node 120, i.e. share a common surface with the current node 120. Therein, the group 136 preferably defines a plane by the four sub-nodes, in which the plane is perpendicular to the considered geometrical axis and directly adjacent to the current node 120 to be evaluated within the present parent node 132. Further, the plane formed by group 136 of the sub-nodes of the one sibling node 134 is opposite of the neighboring node 126. Since the current node 120 is at the high plane of the present parent node 132, the one sibling 134 is in the low plane, while the considered sub-nodes of the group 136 are at the high plane of the one sibling node 134. For the example of the X-axis under consideration as depicted in FIG. 7 (a), if the current node 120 is at the position 4 within the present parent node 132, the considered sibling node 134 is at the corresponding position 0 in the same parent node 132. Similar, the considered neighboring node 126 is at the position 0 in the neighboring parent node (not shown).

In particular, if the current node 120 is positioned in the high plane of its parent node 132, the plane position context information is determined according to the occupancy of a group 136 of sub-nodes of one sibling node 134 in a low plane of the parent node 132, in which each of the sub-nodes sharing a surface with the current node 120, and the occupancy of a neighboring node 126 opposite to the one sibling node 134 relative to the current node 120.

Generally speaking for the case of the current node 120 positioned in the high plane of its parent 132: If at least one sub-node of the group 136 of sub-nodes of the one sibling node 134 is occupied and the neighboring node 126 is unoccupied the plane position context information includes the likelihood of a plane in the current node 120 and the likelihood of a low plane position. If all sub-nodes of the group of sub-nodes of the one sibling node 134 are unoccupied and the neighboring node 126 is occupied, the plane position context information includes the likelihood of a plane in the current node 120 and the likelihood of a high plane position. If all sub-nodes of the one sibling node 134 are unoccupied and the neighboring node 126 is unoccupied, the plane position context information is unknown. If at least one sub-nodes of the group of sub-nodes of the one sibling node 134 is occupied and the neighboring node 126 is occupied, the plane position context information is unknown.

More specifically speaking, in accordance with the FIG. 7 (a), for the evaluation along the X-axis together with the numbering system shown in FIG. 4 if the current node is in the high plane of its parent:

If at least one of the sub-nodes 4 to 7 of the sibling node 134 is occupied and the neighboring nodes 126 is not occupied, the plane position context information includes the likelihood of a plane in the current node 120 and the likelihood of a low plane position.

If the sub-nodes 4 to 7 of the sibling node 134 are not occupied and the neighboring node 126 is occupied, the plane position context information includes the likelihood of a plane in the current node 120 and the likelihood of a high plane position.

If the sub-nodes 4 to 7 of the sibling node 134 are not occupied and the neighboring node 126 is not occupied, the plane position context information is "UNKNOWN".

If at least one of the sub-nodes 4 to 7 of the sibling node 134 is occupied and the is neighboring node is occupied the plane position context information is "UNKNOWN".

Thus, for the coding the probability of a position of a plane perpendicular to the X-axis in the current node is considered as context information when performing entropy coding for the current node being in the low position. Therein, the information might be used as plane position context information in the planar coding mode and the angular coding mode.

For evaluating along Y-axis in accordance to FIG. 7 (b) in order to determine the plane position context information of the current node 120 if the current node is in the high plane, it is set the following:

If at least one of the sub-nodes 2, 3, 6, 7 of the sibling node 134 is occupied and the neighboring node 126 is not occupied, the plane position context information includes the likelihood of a plane in the current node 120 and the likelihood of a low plane position.

If the sub-nodes 2, 3, 6, 7 of the sibling node 134 are not occupied and the neighboring node 126 is occupied, the plane position context information includes the likelihood of a plane in the current node 120 and the likelihood of a high plane position.

If the sub-nodes 2, 3, 6, 7 of the sibling node 134 are not occupied and the neighboring node 126 is not occupied, the plane position context information is "UNKNOWN".

If at least one of the sub-nodes 2, 3, 6, 7 of the sibling node 134 is occupied and the neighboring node 126 is occupied the plane position context information is "UNKNOWN".

Thus, for the coding the probability of a position of a plane perpendicular to the Y-axis in the current node is considered as context information when performing entropy coding for the current node being in the low position. Therein, the information might be used as plane position context information in the planar coding mode and the angular coding mode.

For evaluating along the Z-axis in accordance to FIG. 7 (c) in order to determine the planar context information of the current node 120 if the current node is in the high plane, it is set the following:

If at least one of the sub-nodes 1, 3, 5, 7 of the sibling node 134 is occupied and the neighboring node 126 is not occupied, the plane position context information includes the likelihood of a plane in the current node 120 and the likelihood of a low plane position.

If the sub-nodes 1, 3, 5, 7 of the sibling node 134 are not occupied and the neighboring node 126 is occupied, the plane position context information includes the likelihood of a plane in the current node 120 and the likelihood of a high plane position.

If the sub-nodes 1, 3, 5, 7 of the sibling node 134 are not occupied and the neighboring node 126 is not occupied, the plane position context information is "UNKNOWN".

If at least one of the sub-nodes 1, 3, 5, 7 of the sibling node 134 is occupied and the neighboring node 126 is occupied the plane position context information is "UNKNOWN".

Thus, for the coding the probability of a position of a plane perpendicular to the Z-axis in the current node is considered as context information when performing entropy coding for the current node being in the low position. Therein, the information might be used as plane position context information in the planar coding mode and the angular coding mode.

As a summary, in all cases, a reliable plane position context information model is established which can be used for the entropic encoding in order to consider the occurrence and position of a surface or plane in the respective nodes and use this knowledge to validly predict occupancy of nodes for data compression by the entropy encoder/decoder.

However, information about the already-coded nodes may not always be available. In particular if occupancy information of already-coded nodes is erased in order to reduce memory requirements, the inferences above cannot be made anymore. This behavior can be implemented in current GPCC encoders/decoders by disabling the adjacent_child_contextualization_enabled_flag, i.e. setting this flag to zero. Then, the basis for the inference must be adequately adapted. For the case of the current node 120 being in the low plane, the former information about the occupancy of the group of sub-nodes of the neighboring node 126 is replaced by the occupancy of the neighboring node 126 itself. Analogously, if the current node 120 is at the high plane, the occupancy information of the sub-nodes of the one sibling node 134 is replaced by the occupancy of the one sibling node itself. Then, reliable inference can be made on the basis of the adapted occupancy information which is available even if the adjacent_child_contextualization_enabled_flag is disabled.

More specifically speaking, for the case of the current node in the low plane: if the neighboring node is unoccupied and all sibling nodes of the group of sibling nodes are unoccupied, the plane position context information includes the likelihood of a plane in the current node and the likelihood of a low plane position;

if the neighboring node is unoccupied and at least one of the sibling nodes of the group of sibling nodes is occupied, the plane position context information includes the likelihood of a plane in the current node and the likelihood of a high plane position;

if the neighboring node is unoccupied and all sibling nodes of the group of sibling nodes are unoccupied, the plane position context information is unknown; and if neighboring node is occupied and at least one sibling node of the group of sibling nodes is occupied, the plane position context information is unknown.

Similar, if the current node is in the high plane:

if the one sibling node is occupied and the neighboring node is unoccupied the plane position context information includes the likelihood of a plane in the current node and the likelihood of a low plane position;

if the one sibling node is unoccupied and the neighboring node is occupied, the plane position context information includes the likelihood of a plane in the current node and the likelihood of a high plane position;

if the one sibling node is unoccupied and the neighboring node is unoccupied, the plane position context information is unknown; and if the one sibling node is occupied and the neighboring node is occupied, the plane position context information is unknown.

Referring now to FIG. 8 (a) showing a method for encoding a point cloud to generate a bitstream of compressed point cloud data, in which the point cloud's geometry is represented by an octree-based structure with a plurality of nodes having parent-child relationships by recursively splitting a volumetric space containing the point cloud into sub-volumes each associated with a node of the octree-based structure, including the steps:

Determining S110 a context information of a current node including plane position context information, in which the plane position context information of the current node is determined according to the occupancy of a neighboring node directly adjacent to the current node and the occupancy of at least one sibling node having the same parent node as the current node; and Entropy encoding S120 the occupancy pattern parent node based on the determined context information to produce encoded data for the bitstream.

Referring now to FIG. 8 (b) showing a method for decoding a bitstream of compressed point cloud data to generate a reconstructed point cloud, in which the point cloud's geometry is represented by an octree-based structure with a plurality of nodes having parent-child relationships by recursively splitting a volumetric space containing the point cloud into sub-volumes each associated with a node of the octree-bases structure, including the steps:

entropy decoding S210 the bitstream based on the context information of the current node, in which the context information including plane position context information and the plane position context information of the current node is determined according to the occupancy of a neighboring node directly adjacent to the current node and the occupancy of at least one sibling node having the same parent node as the current node.

Thus, in accordance to the present invention, information about the neighboring node and the sibling nodes are used and evaluated in order to acquire a context information model more reliably predicting the position of a surface within the present child node based on the available data. This information can be used in order to reduce the amount of data of the compressed point cloud data, in which the same context information model is also used for the decoder in order to be able to reliably decode the provide bitstream with high efficiency and accuracy. Thereby, significant data reduction of at least 1% can be achieved with respect to prior encoding methods and current GPCC specification. However, this value is dependent on the density of the points in which in particular for indoor point clouds, such as LiDAR point clouds it is assumed that they can be considered as a dense point cloud.

In embodiments of the encoding or decoding method, the neighboring node sharing a face with the current node along a geometrical axis directly before or after the current node.

In embodiments of the encoding or decoding method, the at least one sibling node encompasses one of
- one sibling node directly before the current node alone a geometrical axis sharing a face with the current node and preferably occupancy of sub-nodes of the one sibling node; or
- a group of four sibling nodes in a plane directly after the current node along the geometrical axis, in which the plane is perpendicular to the geometrical axis.

In embodiments of the encoding or decoding method, the context information is determined along all three geometrical axes.

In embodiments of the encoding or decoding method, if the current node is at a low plane of the parent node, the plane position context information is determined according to the occupancy of a group of sub-nodes of the neighboring node, in which each of the sub-nodes sharing a face with the current node, and an occupancy of a group of four sibling nodes in a high plane of the parent node.

In embodiments of the encoding or decoding method,
- if at least one sub-node of the group of sub-nodes is occupied and all sibling nodes of the group of sibling nodes are unoccupied, the plane position context information includes the likelihood of a plane in the current node and the likelihood of a low plane position;
- if all sub-nodes of the group of sub-nodes are unoccupied and at least one of the sibling nodes of the group of sibling nodes is occupied, the plane position context information includes the likelihood of a plane in the current node and the likelihood of a high plane position;
- if all sub-nodes of the group of sub-nodes are unoccupied and all sibling nodes of the group of sibling nodes are unoccupied, the plane position context information is unknown; and
- if at least one sub-nodes of the group of sub-nodes is occupied and at least one sibling node of the group of sibling nodes is occupied, the plane position context information is unknown.

In embodiments of the encoding or decoding method, for the case that the occupancy of the already-coded nodes is not available,
- if the neighboring node is unoccupied and all sibling nodes of the group of sibling nodes are unoccupied the plane position context information includes the likelihood of a plane in the current node and the likelihood of a low plane position;
- if the neighboring node is unoccupied and at least one of the sibling nodes of the group of sibling nodes is occupied, the plane position context information includes the likelihood of a plane in the current node and the likelihood of a high plane position;
- if the neighboring node is unoccupied and all sibling nodes of the group of sibling nodes are unoccupied, the plane position context information is unknown; and
- if neighboring node is occupied and at least one sibling node of the group of sibling nodes is occupied, the plane position context information is unknown.

In embodiments of the encoding or decoding method, if the current node is at a high plane of the parent node, plane position context information is determined according to the occupancy of a group of sub-nodes of one sibling node in a low plane of the parent node, in which each of the sub-nodes sharing a face with the current node, and the occupancy of a neighboring node opposite to the one sibling node relative to the current node.

In embodiments of the encoding or decoding method,
- if at least one sub-node of the group of sub-nodes is occupied and the neighboring node is unoccupied the plane position context information includes the likelihood of a plane in the current node and the likelihood of a low plane position;
- if all sub-nodes of the group of sub-nodes are unoccupied and the neighboring node is occupied, the plane position context information includes the likelihood of a plane in the current node and the likelihood of a high plane position;
- if all sub-nodes of the group of sub-nodes are unoccupied and the neighboring node is unoccupied, the plane position context information is unknown; and
- if at least one sub-nodes of the group of sub-nodes is occupied and the neighboring node is occupied, the plane position context information is unknown.

In embodiments of the encoding or decoding method, for the case that the occupancy of the already-coded nodes is not available,
- if the one sibling node is occupied and the neighboring node is unoccupied the plane position context information includes the likelihood of a plane in the current node and the likelihood of a low plane position;
- if the one sibling node is unoccupied and the neighboring node is occupied, the plane position context information includes the likelihood of a plane in the current node and the likelihood of a high plane position;
- if the one sibling node is unoccupied and the neighboring node is unoccupied, the plane position context information is unknown; and
- if the one sibling node is occupied and the neighboring node is occupied, the plane position context information is unknown.

In embodiments of the encoding or decoding method, if in the planar coding mode the closest already coded node at the same coordinate in the respective parent node and the same depth D in the octree-based structure exists and is planar, the context information further includes one or more of:
- a distance d from the closest already node at the same coordinate in the respective parent node and the same depth D in the octree-based structure;
- a plane position of the closest already coded node at the same coordinate in the respective parent node and the same depth D in the octree-based structure; and
- an indication of an axis normal to the plane.

In embodiments of the encoding or decoding method, the context information includes 54 bit or less.

In a preferred embodiment the method for encoding/decoding a point cloud to generate a bitstream of compressed point cloud data is implemented in a LIDAR (Light detection and ranging) device. The LIDAR device includes a light transmitting module and a sensor module. Therein, the light transmitting module is configured to scan the environment with laser light and an echo of the laser light reflected by objects in the environment is measured with a sensor of the sensor module. Further, the LIDAR device includes an evaluation module configured to determine a 3D representation of the environment in a point cloud preferably by differences in laser return times and/or wavelengths of the reflected laser light. Thereby, the echo may include up to millions of points of position information of the objects or environment resulting in large point clouds increasing the demands on computational devices to further process or evaluating this point clouds. In certain applications such as autonomous driving, processing of the LIDAR point cloud must be almost in real-time due to safety requirements. Thus, efficient and accurate compression of the point could data is necessary. Therefore, the LIDAR device may include an encoder including a processor and a memory storage device. The memory storage device may store a computer program or application containing instructions that, when executed, causing the processor to perform operations such as those described herein. For example, the instructions may encode and output bitstreams encoded in accordance with the methods described herein. Additionally or alternatively, the LIDAR device may include a decoder including a processor and a memory storage device. The memory storage device may include a computer program or application containing instructions that, when executed, cause the processor to perform operations such as those described herein. Thus, by the encoder/decoder efficient and accurate compression of the point cloud data is enabled, providing the possibility to handle the acquired point cloud data more efficiently and preferably in real-time. Preferably, the processor of the encoder and the processor of the decoder are the same. Preferably, the memory storage device of the encoder and the memory storage device of the decoder are the same. Preferably the processor of the encoder and/or decoder are further configured to further process or evaluate the point cloud even more preferably in real-time. In particular, for the example of autonomous driving, evaluation of the point cloud could include determination of obstacles in the direction of driving.

Figure 9:
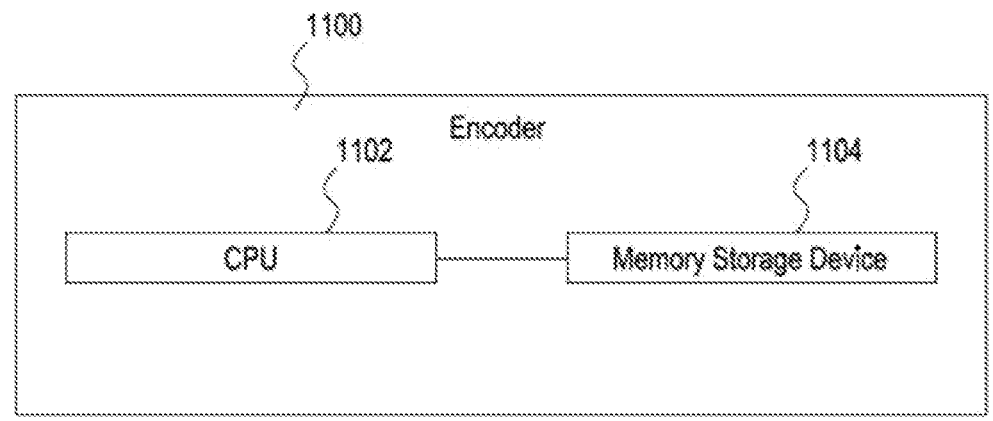
FIG. 9 is a schematic illustration of an encoder device, in an embodiment.

Reference is now made to FIG. 9, which shows a simplified block diagram of an example embodiment of an encoder 1100. The encoder 1100 includes a processor 1102 and a memory storage device 1104. The memory storage device 1104 may store a computer program or application containing instructions that, when executed, cause the processor 1102 to perform operations such as those described herein. For example, the instructions may encode and output bitstreams encoded in accordance with the methods described herein. It will be understood that the instructions may be stored on a non-transitory computer-readable medium, such as a compact disc, flash memory device, random access memory, hard drive, etc. When the instructions are executed, the is processor 1102 carries out the operations and functions specified in the instructions so as to operate as a special-purpose processor that implements the described process(es). Such a processor may be referred to as a "processor circuit" or "processor circuitry" in some examples.

Figure 10:
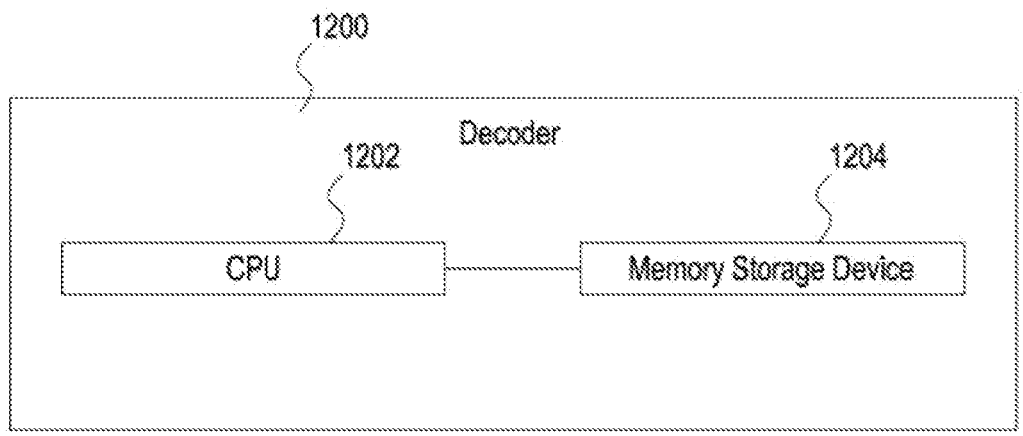
FIG. 10 is a schematic illustration of a decoder device, in an embodiment.

Reference is now also made to FIG. 10, which shows a simplified block diagram of an example embodiment of a decoder 1200. The decoder 1200 includes a processor 1202 and a memory storage device 1204. The memory storage device 1204 may include a computer program or application containing instructions that, when executed, cause the processor 1202 to perform operations such as those described herein. It will be understood that the instructions may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es) and methods. Such a processor may be referred to as a "processor circuit" or "processor circuitry" in some examples.

It will be appreciated that the decoder and/or encoder according to the present application may be implemented in a number of computing devices, including, without limitation, servers, suitably programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive. In particular, embodiments can be freely combined with each other.

The invention claimed is:

1. A method for encoding a point cloud to generate a bitstream of compressed point cloud data, wherein the point cloud's geometry is represented by an octree-based structure with a plurality of nodes having parent-child relationships, by recursively splitting a volumetric space containing the point cloud into sub-volumes each associated with a node of the octree-based structure, comprising the steps:
  determining context information of a current node including plane position context information for at least one geometrical axis, wherein the plane position context information of the current node on the at least one geometrical axis is determined according to an occupancy of a neighboring node directly adjacent to the current node on the at least one geometrical axis and an occupancy of at least one sibling node having same parent node as the current node, the plane position context information is used for coding a plane position flag in a planar coding mode, the plane position flag indicating a position of a plane in the current node; and
  entropy encoding the occupancy information of the current node based on the determined context information to produce encoded data for the bitstream;
  wherein, in a case that the current node is at a low plane of the parent node, the plane position context information is determined according to an occupancy of a group of sub-nodes of the neighboring node, wherein each of the sub-nodes shares a face with the current node, and an occupancy of a group of four sibling nodes in a high plane of the parent node;
  wherein if in the planar coding mode at least one closest already coded node at a same coordinate in a respective parent node and a same depth D in the octree-based structure exists and is planar, the context information further includes one or more of:
- a distance d from the at least one closest already node at the same coordinate in the respective parent node and the same depth D in the octree-based structure;
- a plane position of the at least one closest already coded node at the same coordinate in the respective parent node and the same depth D in the octree-based structure; and
- an axis normal to the plane.

2. The method according to claim 1, characterized in that the neighboring node shares a face with the current node along a geometrical axis directly before or after the current node.

3. The method according to claim 1, characterized in that the at least one sibling node encompasses one of:
- one sibling node directly before the current node along a geometrical axis sharing a face with the current node and preferably an occupancy of sub-nodes of the one sibling node; or
- a group of four sibling nodes in a plane directly after the current node along the geometrical axis, wherein the plane is perpendicular to the geometrical axis.

4. The method according to claim 1, characterized in that the context information is determined along all three geometrical axes.

5. The method according to claim 1, characterized in that for the case that the current node is at the low plane of the parent node,
- if at least one sub-node of the group of sub-nodes of the neighboring node is occupied and all sibling nodes of the group of sibling nodes are unoccupied, the plane position context information includes a likelihood of a plane in the current node and a likelihood of a low plane position;
- if all sub-nodes of the group of sub-nodes of the neighboring node are unoccupied and at least one of the sibling nodes of the group of sibling nodes is occupied, the plane position context information includes a likelihood of a plane in the current node and a likelihood of a high plane position;
- if all sub-nodes of the group of sub-nodes of the neighboring node are unoccupied and all sibling nodes of the group of sibling nodes are unoccupied, the plane position context information is unknown; and
- if at least one sub-nodes of the group of sub-nodes of the neighboring node is occupied and at least one sibling node of the group of sibling nodes is occupied, the plane position context information is unknown;
- for the case that the current node is at the low plane of the parent node and an occupancy of already-coded nodes is not available,
- if the neighboring node is unoccupied and all sibling nodes of the group of sibling nodes are unoccupied, the plane position context information includes a likelihood of a plane in the current node and a likelihood of a low plane position;
- if the neighboring node is unoccupied and at least one of the sibling nodes of the group of sibling nodes is occupied, the plane position context information includes a likelihood of a plane in the current node and a likelihood of a high plane position;
- if the neighboring node is unoccupied and all sibling nodes of the group of sibling nodes are unoccupied, the plane position context information is unknown; and
- if neighboring node is occupied and at least one sibling node of the group of sibling nodes is occupied, the plane position context information is unknown.

6. The method according to claim 1, characterized in that for a case that the current node is at a high plane of the parent node,
- if at least one sub-node of the group of sub-nodes of the one sibling node is occupied and the neighboring node is unoccupied, the plane position context information includes a likelihood of a plane in the current node and a likelihood of a low plane position;
- if all sub-nodes of the group of sub-nodes of the one sibling node are unoccupied and the neighboring node is occupied, the plane position context information includes a likelihood of a plane in the current node and a likelihood of a high plane position;
- if all sub-nodes of the group of sub-nodes of the one sibling node are unoccupied and the neighboring node is unoccupied, the plane position context information is unknown; and
- if at least one sub-nodes of the group of sub-nodes of the one sibling node is occupied and the neighboring node being occupied, the plane position context information is unknown;
- for the case that the current node is at the high plane of the parent node and an occupancy of already-coded nodes is not available,
- if the one sibling node is occupied and the neighboring node is unoccupied, the plane position context information includes a likelihood of a plane in the current node and a likelihood of a low plane position;
- if the one sibling node is unoccupied and the neighboring node is occupied, the plane position context information includes a likelihood of a plane in the current node and a likelihood of a high plane position;
- if the one sibling node is unoccupied and the neighboring node is unoccupied, the plane position context information is unknown; and
- if the one sibling node is occupied and the neighboring node is occupied, the plane position context information is unknown.

7. The method according to claim 1 characterized in that the context information includes 54 bit or less.

8. An encoder for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the encoder comprising:
- a processor and
- a memory storage device, wherein in the memory storage device instructions executable by the processor are stored that, when executed, cause the processor to perform:
  - determining context information of a current node including plane position context information for at least one geometrical axis, wherein the plane position context information of the current node on the at least one geometrical axis is determined according to an occupancy of a neighboring node directly adjacent to the current node on the at least one geometrical axis and an occupancy of at least one sibling node having same parent node as the current node, the plane position context information is used for coding a plane position flag in a planar coding mode, the plane position flag indicating a position of a plane in the current node; and entropy encoding the occupancy information of the current node based on the determined context information to produce encoded data for the bitstream;

wherein, in a case that the current node is at a low plane of the parent node, the plane position context information is determined according to an occupancy of a group of sub-nodes of the neighboring node, wherein each of the sub-nodes shares a face with the current node, and an occupancy of a group of four sibling nodes in a high plane of the parent node;

wherein if in the planar coding mode at least one closest already coded node at the same coordinate in the respective parent node and the same depth D in the octree-based structure exists and is planar, the context information further includes one or more of:

a distance d from the at least one closest already node at the same coordinate in the respective parent node and the same depth D in the octree-based structure;

a plane position of the at least one closest already coded node at the same coordinate in the respective parent node and the same depth D in the octree-based structure; and an axis normal to the plane.

9. A method for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, comprising the steps:

entropy decoding the bitstream based on context information of a current node, wherein the context information includes plane position context information for at least one geometrical axis and the plane position context information of the current node on the at least one geometrical axis is determined according to an occupancy of a neighboring node directly adjacent to the current node on the at least one geometrical axis and an occupancy of at least one sibling node having same parent node as the current node, the plane position context information is used for coding a plane position flag in a planar coding mode, the plane position flag indicating a position of a plane in the current node;

wherein, in a case that the current node is at a low plane of the parent node, the plane position context information is determined according to an occupancy of a group of sub-nodes of the neighboring node, wherein each of the sub-nodes shares a face with the current node, and an occupancy of a group of four sibling nodes in a high plane of the parent node;

wherein if in the planar coding mode at least one closest already coded node at a same coordinate in a respective parent node and a same depth D in the octree-based structure exists and is planar, the context information further includes one or more of:

a distance d from the at least one closest already node at the same coordinate in the respective parent node and the same depth D in the octree-based structure;

a plane position of the at least one closest already coded node at the same coordinate in the respective parent node and the same depth D in the octree-based structure; and an axis normal to the plane.

10. The method according to claim 9, characterized in that the neighboring node shares a face with the current node along a geometrical axis directly before or after the current node.

11. The method according to claim 9, characterized in that the at least one sibling node encompasses one of:

one sibling node directly before the current node along a geometrical axis sharing a face with the current node and preferably an occupancy of sub-nodes of the one sibling node; or a group of four sibling nodes in a plane directly after the current node along the geometrical axis, wherein the plane is perpendicular to the geometrical axis.

12. The method according to claim 9, characterized in that the context information is determined along all three geometrical axes.

13. The method according to claim 9, characterized in that for the case that the current node is at the low plane of the parent node, if at least one sub-node of the group of sub-nodes of the neighboring node is occupied and all sibling nodes of the group of sibling nodes are unoccupied, the plane position context information includes a likelihood of a plane in the current node and a likelihood of a low plane position;

if all sub-nodes of the group of sub-nodes of the neighboring node are unoccupied and at least one of the sibling nodes of the group of sibling nodes is occupied, the plane position context information includes a likelihood of a plane in the current node and a likelihood of a high plane position;

if all sub-nodes of the group of sub-nodes of the neighboring node are unoccupied and all sibling nodes of the group of sibling nodes are unoccupied, the plane position context information is unknown; and if at least one sub-nodes of the group of sub-nodes of the neighboring node is occupied and at least one sibling node of the group of sibling nodes is occupied, the plane position context information is unknown;

for the case that the current node is at the low plane of the parent node and an occupancy of already-coded nodes is not available, if the neighboring node is unoccupied and all sibling nodes of the group of sibling nodes are unoccupied, the plane position context information includes a likelihood of a plane in the current node and a likelihood of a low plane position;

if the neighboring node is unoccupied and at least one of the sibling nodes of the group of sibling nodes is occupied, the plane position context information includes a likelihood of a plane in the current node and a likelihood of a high plane position;

if the neighboring node is unoccupied and all sibling nodes of the group of sibling nodes are unoccupied, the plane position context information is unknown; and if neighboring node is occupied and at least one sibling node of the group of sibling nodes is occupied, the plane position context information is unknown.

14. The method according to claim 9, characterized in that for a case that the current node is at a high plane of the parent node, if at least one sub-node of the group of sub-nodes of the one sibling node is occupied and the neighboring node is unoccupied, the plane position context information includes a likelihood of a plane in the current node and a likelihood of a low plane position;

if all sub-nodes of the group of sub-nodes of the one sibling node are unoccupied and the neighboring node is occupied, the plane position context information includes a likelihood of a plane in the current node and a likelihood of a high plane position;

if all sub-nodes of the group of sub-nodes of the one sibling node are unoccupied and the neighboring node is unoccupied, the plane position context information is unknown; and if at least one sub-nodes of the group of sub-nodes of the one sibling node is occupied and the neighboring node being occupied, the plane position context information is unknown;

for the case that the current node is at the high plane of the parent node and an occupancy of already-coded nodes is not available, if the one sibling node is occupied and the neighboring node is unoccupied, the plane position context information includes a likelihood of a plane in the current node and a likelihood of a low plane position;

if the one sibling node is unoccupied and the neighboring node is occupied, the plane position context information includes a likelihood of a plane in the current node and a likelihood of a high plane position;

if the one sibling node is unoccupied and the neighboring node is unoccupied, the plane position context information is unknown; and if the one sibling node is occupied and the neighboring node is occupied, the plane position context information is unknown.

15. The method according to claim 9 characterized in that the context information includes 54 bits or less.

16. A decoder for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the decoder comprising:

a processor and a memory storage device, wherein in the memory storage device instructions executable by the processor are stored that, when executed, cause the processor to perform the method according to claim 9.

* * * * *